(12) United States Patent
Ikebe et al.

(10) Patent No.: US 7,359,549 B2
(45) Date of Patent: Apr. 15, 2008

(54) IMAGING DEVICE, IMAGE PROCESSING METHOD, AND RECORDING MEDIUM

(75) Inventors: Keiichi Ikebe, Kanagawa (JP); Takao Inoue, Kanagawa (JP); Akira Takahashi, Kanagawa (JP); Takashi Maki, Kanagawa (JP); Taku Kodama, Kanagawa (JP); Ikuko Yamashiro, Kanagawa (JP); Takanori Yano, Kanagawa (JP); Takeshi Koyama, Tokyo (JP); Shin Aoki, Kanagawa (JP); Hiroyuki Sakuyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 826 days.

(21) Appl. No.: 10/676,535

(22) Filed: Sep. 30, 2003

(65) Prior Publication Data
US 2004/0126019 A1 Jul. 1, 2004

(30) Foreign Application Priority Data
Sep. 30, 2002 (JP) .............................. 2002-286044

(51) Int. Cl.
*G06K 9/36* (2006.01)
*G06K 9/00* (2006.01)

(52) U.S. Cl. ...................... 382/166; 382/239; 382/167

(58) Field of Classification Search ..................... None
See application file for complete search history.

(56) References Cited

U.S. PATENT DOCUMENTS

| | | | |
|---|---|---|---|
| 5,748,786 A * | 5/1998 | Zandi et al. | 382/240 |
| 5,898,794 A * | 4/1999 | Sonohara et al. | 382/166 |
| 6,222,941 B1 * | 4/2001 | Zandi et al. | 382/232 |
| 6,269,183 B1 * | 7/2001 | Matoba et al. | 382/166 |
| 6,285,398 B1 * | 9/2001 | Shinsky et al. | 348/223.1 |
| 6,785,423 B1 * | 8/2004 | Joshi et al. | 382/235 |
| 6,825,876 B1 * | 11/2004 | Easwar et al. | 348/234 |
| 6,832,001 B1 * | 12/2004 | Kashiwagi | 382/166 |
| 6,934,418 B2 * | 8/2005 | Okada | 382/240 |
| 6,958,772 B1 * | 10/2005 | Sugimori | 348/222.1 |
| 6,967,753 B2 * | 11/2005 | Schramm | 358/530 |
| 7,002,627 B1 * | 2/2006 | Raffy et al. | 348/273 |
| 7,072,520 B2 * | 7/2006 | Schwartz et al. | 382/251 |

FOREIGN PATENT DOCUMENTS

| | | |
|---|---|---|
| JP | 01-292987 | 11/1989 |
| JP | 11-041613 | 2/1999 |
| JP | 2002-152733 | 5/2002 |
| JP | 2002-516540 | 6/2002 |

OTHER PUBLICATIONS

Noguchi, Y., "Next Generation Image Encoding Method JPEG 2000", Triceps, Tokyo, Feb. 13, 2001 (in Japanese).
Japanese Office Action Notice of Rejection of Japanese Patent Application No. 2002-286044 (the date of issue: Feb. 7, 2007).

* cited by examiner

*Primary Examiner*—Wenpeng Chen
*Assistant Examiner*—Yuzhen Ge
(74) *Attorney, Agent, or Firm*—Blakely, Sokoloff, Taylor & Zafman LLP

(57) ABSTRACT

An image processing method includes obtaining raw image data of an object by generating the object by an imager that generates an image of the object with color decomposition, decomposing the raw image data into a plurality of color planes such that each of the color planes comprises pixel information of a color pertinent to the color plane, and compressing data of each color plane.

2 Claims, 13 Drawing Sheets

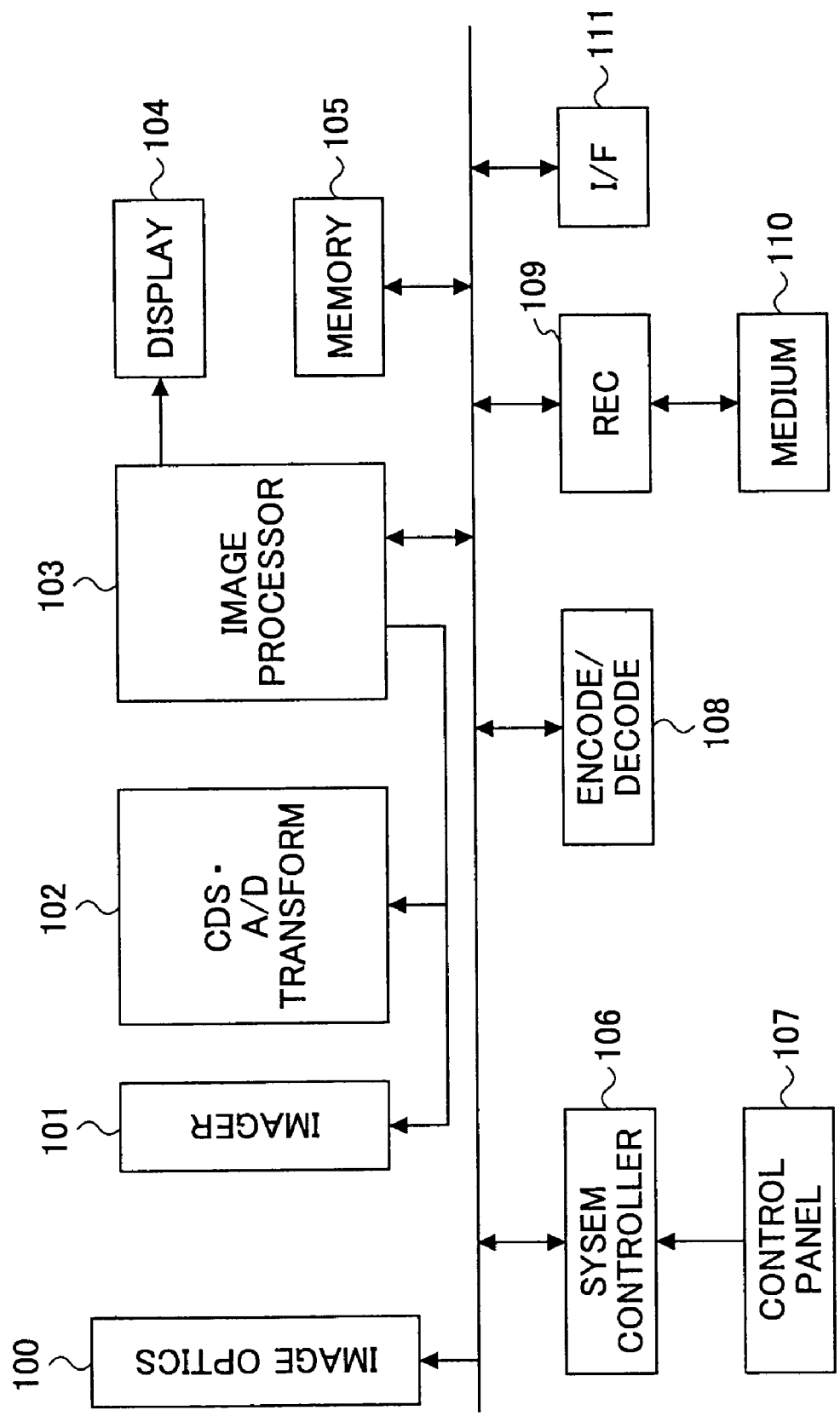

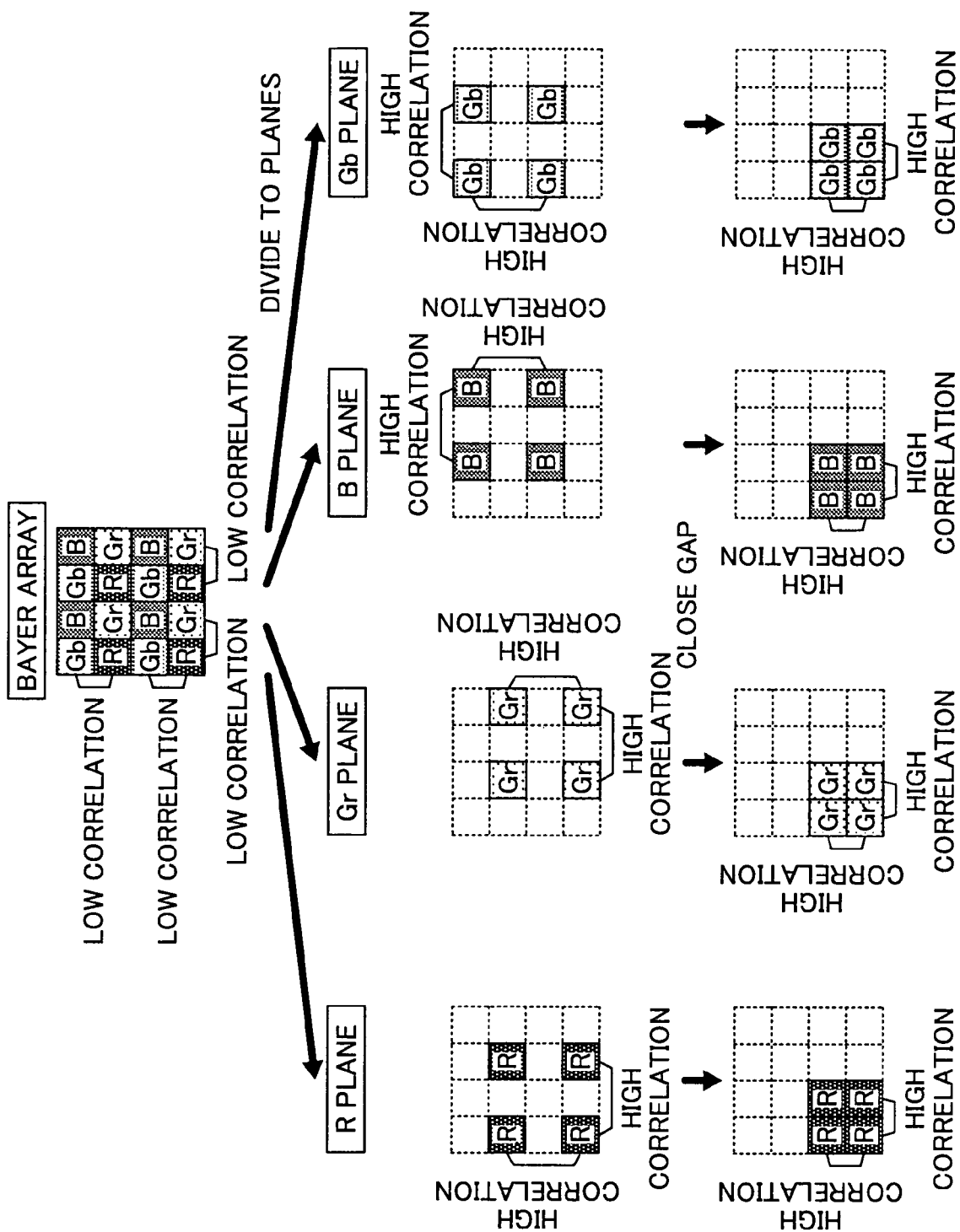

FIG.5

| G | M | G | M |
|---|---|---|---|
| Y | C | Y | C |
| G | M | G | M |
| Y | C | Y | C |

FIG.6

| Y | M | C | G | Y | M | C | G |
|---|---|---|---|---|---|---|---|
| Y | M | C | G | Y | M | C | G |
| Y | M | C | G | Y | M | C | G |
| Y | M | C | G | Y | M | C | G |

DECOMPOSITION LEVEL=0

DECOMPOSITION LEVEL=1

DECOMPOSITION LEVEL=2

DECOMPOSITION LEVEL=3

FIG.13
CODE FORMAT GENETRAL SCHEMA
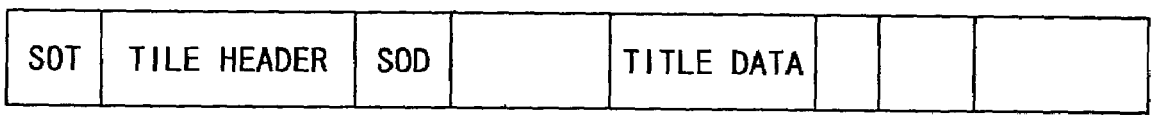
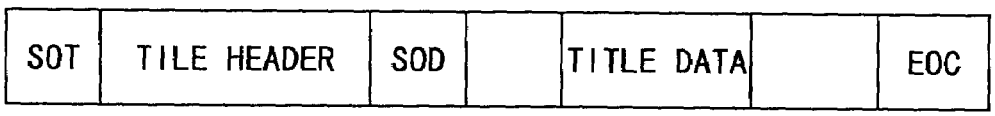

IMAGING DEVICE, IMAGE PROCESSING METHOD, AND RECORDING MEDIUM

The present application claims priority to the corresponding Japanese Application No. 2002-286044, filed on Sep. 30, 2002, the entire contents of which are hereby incorporated by reference.

BACKGROUND OF THE INVENTION

The present invention relates to imaging devices for generating color images such as digital still cameras, digital video cameras, stand-alone type image scanners, image scanners integrated to copying machines, and the like. More particularly, the present invention relates to an imaging device that uses an imager of the type of that generates an image with color decomposition.

A CCD-type or MOS-type imager (imaging element) for use in digital still cameras or digital video cameras generally has color filters for color decomposition on an imaging surface thereof and captures an image with color decomposition. Thus, each pixel therein provides information about only one color component. Thus, generally conduct color interpolating processing is performed for each of the pixels in the imager for interpolating image information of two other color components, by using the image information of the nearby pixels, such that the image information for all the color components is acquired for each of the pixels in the imager. With this, color pixel data is obtained for all the pixels on the imager.

During the foregoing interpolation processing, other signal processing such as white-balance processing, gamma correction processing, edge enhancement processing, and the like, are generally conducted simultaneously.

The color image data thus processed is generally recorded on a recording medium after compression according to a compression encoding algorithm such as JPEG.

On the other hand, there are cameras that record image date without compression.

Further, there are some high-grade cameras such as single-lens reflex type digital still cameras that have the function or mode of raw-data recording for image data recording. In this raw-data recording mode, the output signal of the imager is recorded on the recording medium after conversion to digital signals (raw image data) without applying data compression.

With regard to the technology of compression of image information obtained by an imager, there is proposed a method and apparatus that uses primary color filters of a Bayer array (see FIG. 2A) in Japanese Laid-Open Patent Application 2002-516540. According to this technology, data compression is applied independently to four signals, i.e., a differential signal of adjacent R and G pixels, a G signal of the G pixel, a differential signal of adjacent B and G pixels, and a G signal of a G pixel.

In the art of digital still cameras and digital video cameras, JPEG or MPEG technology have been used commonly for compression of image data, while JPEG 2000 (ISO/IEC FCD 15444-1) or Motion-JPEG 2000 (ISO/IEC FCD 1544-3) is drawing attention as a new compressive encoding algorithm that can replace the foregoing conventional algorithms.

Meanwhile, it should be noted that the content of the signal processing mentioned above depends on the manufacturer of the imaging device and the details of the processing are usually not disclosed. Thus, in the case a user wishes to conduct a retouch process to the image data according to the object or purpose of generating pictures, or according to the preference of the user, by using a retouch software, it is preferable that the user can use the row image data, which is free from the effect of signal processing that is conducted inside the camera. Further, it is preferable that the effect of the signal processing in the camera does not appear in such a retouch process even in the case that non-reversible compression of image data has been conducted in the camera.

A raw image data recording mode is the mode for meeting the demands of the user. On the other hand, such a row image data recording mode has a drawback in that the amount of the image data to be stored in the recording medium becomes enormous. In case the imager has three million pixels, for example, the image data for a single picture may be several megabytes or more, and the efficiency of using the recording medium is degraded seriously.

In the case of the technology described in the foregoing Japanese Laid-Open Patent Application 2002-516540, op. cit., too, there is conducted a processing for calculating the R-G and B-G difference signals, and thus, problems arise that are similar to the case of signal processing conducted inside the camera as noted above.

SUMMARY OF THE INVENTION

A method and apparatus for image processing is disclosed. In one embodiment, the color imaging device comprises an imager that generates an image with color decomposition. The imager produces raw image data as a result of generating the image. The color imaging device also comprises a raw image data decomposing unit to decompose the raw image data into multiple color planes such that each color plane includes data of pixels of the same color in the form of sub-color image data. The data compressing unit compresses the sub-color image data for each of the multiple color planes.

BRIEF DESCRIPTION OF THE DRAWINGS

FIG. 1 is a block diagram of one embodiment of an image processing system;

FIGS. 2A-2C are diagrams illustrating a Bayer array of primary color filters and decomposition of raw image data into color planes;

FIG. 5 is a diagram showing a Bayer array of complementary color filters;

FIG. 6 is a diagram showing a line array of complementary filters;

FIG. 13 is a diagram showing format of encoded data of JPEG 2000; and

DETAILED DESCRIPTION OF THE INVENTION

Figures 3A, 3B, 3C:
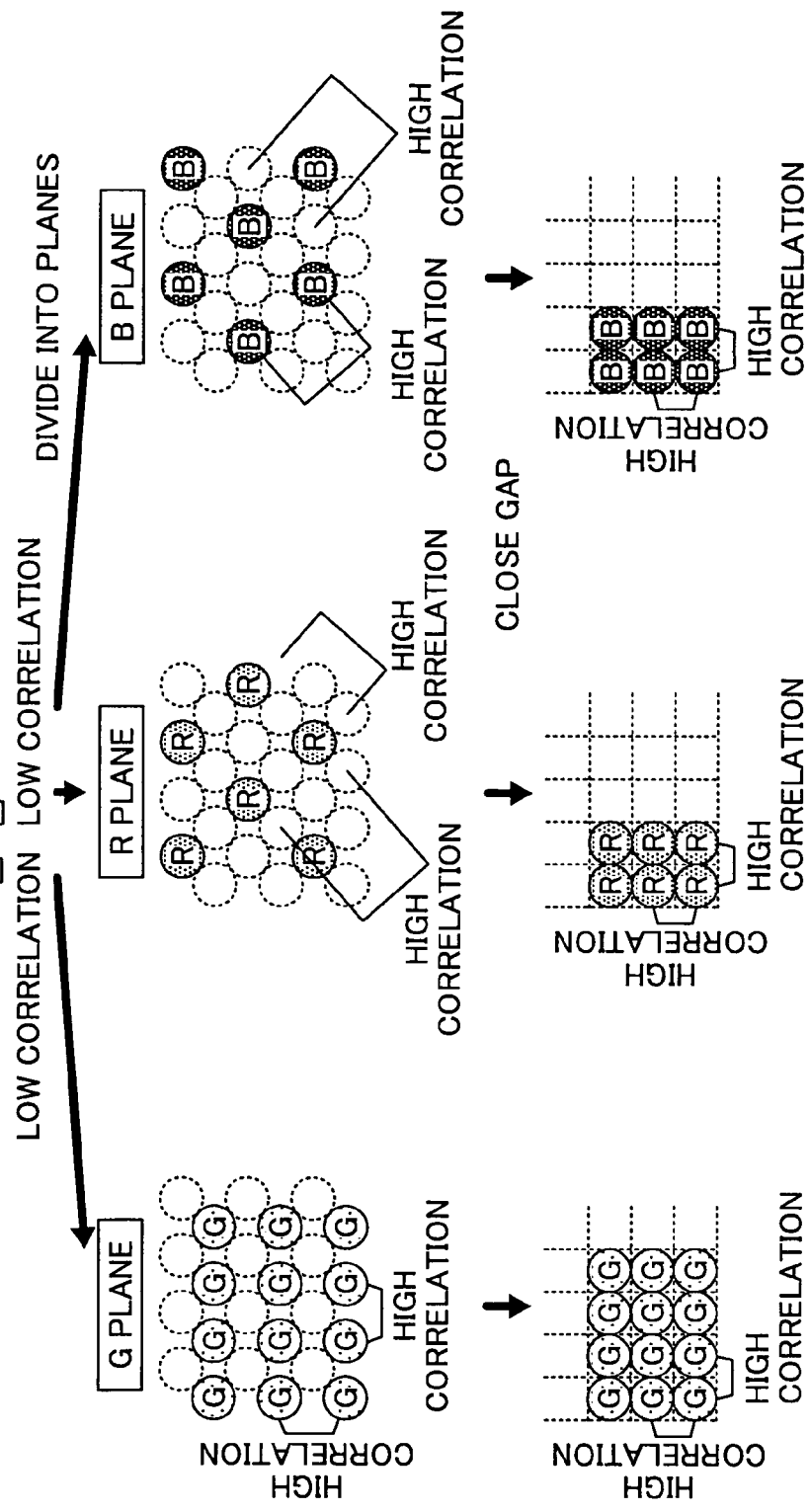
FIGS. 3A-3C are diagrams illustrating an oblique array of primary color filters and decomposition of raw image data into color planes.

Accordingly, one embodiment of the present invention provides an imaging device wherein the foregoing problems are eliminated.

In the case of the technology described in the foregoing Japanese Laid-Open Patent Application 2002-516540, op. cit., too, there is conducted a process for calculating the R-G and B-G difference signals, and thus, there arises problems similar to the case of signal processing conducted inside the camera as noted above.

Another and more specific embodiment of the present invention provides an imaging device of the type that generates an image with color decomposition, where the image data is compressed efficiently and simultaneously without undergoing the influence of the signal processing conducted inside the imaging device.

Another embodiment of the present invention provides a color imaging device that includes an imager that generates an image with color decomposition, where the imager produces raw image data as a result of generating the image; a data decomposing unit to decompose the raw image data into a plurality of color planes such that each color plane includes data of pixels of the same color in the form of sub-color image data; and a data compressing unit to compress the sub-color image data for each of the plurality of color planes.

In one embodiment of the color imaging device noted above, the data compressing unit conducts a reversible data compression for each of the plurality of color planes.

In another embodiment of the color imaging device noted above, the data compression unit applies a reversible data compression to a specific color plane that provides a relatively large influence on the resolution of a reproduced image and further a non-reversible data compression to the other color planes that provide less influence on the resolution of the reproduced image.

In another embodiment of the color imaging device of the present invention noted above, the data compression unit applies a non-reversible compression to all of the plurality of color planes.

In another embodiment of the color imaging device of the present invention noted above, a controller is provided for controlling the compression ratio for a specific color plane that provides a larger effect on the resolution of the reproduced image, independently to the compression ratio for other color planes in which the effect on the resolution of the reproduced image is smaller.

In another embodiment of the present invention, the controller sets, in the case a user of the color imaging device attaches importance to resolution of reproduced images, the compression ratio of the specific color plane to be smaller than a standard compression ratio.

In another embodiment of the present invention, the controller sets, in the case a user of the color imaging device attaches importance to resolution of reproduced images, the compression ratio of the specific color plane to be smaller than a standard compression ratio and the compression ratio of the other color planes to be larger than the standard compression ratio.

In another embodiment of the present invention, the controller sets, in the case a user of the color imaging device attaches importance to color reproducibility of reproduced images, the compression ratio of the specific color plane to be smaller than a standard compression ratio.

In another embodiment of the present invention, the controller sets, in the case a user of the color imaging device attaches importance to color reproducibility of reproduced images, the compression ratio of the specific color plane to be smaller than a standard compression ratio and the compression ratio of other color planes to be larger than the standard compression ratio.

In a further embodiment of the present invention, the data compression unit applies a non-reversible compression to all of the plurality of color planes, and a controller is provided that controls a compression ratio of each of the color planes independently.

In a further embodiment of the present invention, there is further provided an information acquiring unit that acquires information for determining the compression ratio for each of the color planes, and wherein the controller determines the compression ratio of each of the color planes based on the information acquired by the information acquiring unit.

In a further embodiment of the present invention, the information acquiring unit acquires information about the proportion of high frequency components for each color, and wherein the controller sets the compression ratio of the color plane in which the proportion of the high-frequency component is smallest to be higher than a standard compression ratio.

In a further embodiment of the present invention, the information acquiring unit acquires evaluation of white-balance, and wherein the controller determines whether the proportion of the color component is large or small based on the evaluation, the controller further setting the compression ratio of the color plane of which white-balance is determined as being small to be larger than a standard compression ratio.

In a further embodiment of the present invention, the controller sets the compression ratio for each color plane based on an instruction of a user of the color imaging device.

In a further embodiment of the present invention, the compression unit compresses data of each color plane according to a compression encoding algorithm in compliance with JPEG 2000.

Another embodiment of the present invention provides an image processing process, comprising: obtaining raw image data by an imager that generates an image of an object with color decomposition; decomposing the raw image data into a plurality of color planes, where each of the color planes comprising pixel information of a color pertinent to the color plane; and compressing data of each color plane.

In one embodiment of the present invention, the operation of compressing the color plane is conducted by a reversible compression process for all of the color planes.

In a further embodiment of the present invention, the compression operation is conducted such that only a specific color plane which provides a large influence on a reproduced image is subjected to a reversible compression process while the remaining color planes are subjected to an irreversible compression process.

In a further embodiment of the present invention, the compression operation is conducted with an irreversible process for all of the color planes.

In a further embodiment of the present invention, a compression ratio for a specific color plane that provides a large influence on the resolution of a reproduced image is set independently with respect to a compression ratio of other color planes in which the influence on the resolution of the reproduced image is smaller.

In a further embodiment of the present invention, the process further includes setting a compression ratio for each of the color planes independently.

In a still further embodiment of the present invention, the process further includes acquiring information for determining the compression ratio for each of the color planes from the raw image data, where the compression ratio is determined by the acquired information.

In a yet another embodiment of the present invention, the compression is conducted according to a compression encoding algorithm in compliance with JPEG 2000.

According to the present invention, high compression efficiency is achieved as compared with the case of compressing the raw image data itself because of the compression conducted for each of the color planes divided out or decomposed from the raw image data. Thereby, it should be noted that strong correlation existing between adjacent pixels in such color planes is utilized. As the encoded data thus obtained is derived directly from the raw image data, which is free from signal processing such as color interpolation processing, white balance processing, gamma correction processing, edge enhancement processing, and the like, conducted in the camera, the encoded data thus obtained is also free from the effect of such signal processing. Because of the high compression ratio, the image data obtained by one embodiment of the present invention has a compact size and the efficiency of utilization of recording medium is improved substantially when the encoded image data of the present invention is recorded on a recording medium as compared with the case of recording the raw image data itself or as compared with the case of recording the raw image data with straightforward compression.

By conducting a reversible compression for all of the color planes, it becomes possible to reproduce the image data exactly identical with the raw image data, which is free from the effect of signal processing noted above. Because of the strong correlation existing between adjacent pixels, embodiments of the present invention can achieve high compression efficiency even when such a reversible compression process is employed.

By employing reversible compression to a specific color plane, which provides a profound effect on the reproduced image quality, and applying irreversible compression to the remaining color planes, it becomes possible to reduce the file size of the obtained encoded image data while reducing, and potentially minimizing, the deterioration in the reproduced image quality.

Further, by employing irreversible compression for all of the color planes, it becomes possible to reduce the file size of the encoded image data further and the efficiency of utilization of the recording medium is improved further.

In the case of employing irreversible compression for all of the color planes, it becomes possible to improve the efficiency of compression while reducing, and potentially minimizing, the degradation of resolution or color reproducibility of reproduced image, by changing the compression ratio between the color planes independently such that a compression ratio smaller than a standard compression ratio is applied to a specific color plane that provides a profound effect on the resolution or color reproducibility of reproduced image.

By constructing the imaging device such that the user can specify the compression ratio, it becomes possible to conduct image processing according to the object of the picturing. Alternatively, the compression ratio can be set automatically by extracting information about setting of the compression ratio from the raw image data.

By using JPEG 2000 compression encoding algorithm for the compression, the degradation of image quality is suppressed in an embodiment of the present invention and high efficiency of compression is achieved at the same time even in the case of conducting reversible compression. Further, by conducting post quantization process, it becomes possible to adjust the compression ration without conducting a recompression process. Thereby, the compression can be achieved more easily with a target compression ratio.

Other objects and further features of the present invention will become apparent from the following detailed description of embodiments of the present invention when read in conjunction with the attached drawings.

In the description below, JPEG 2000 (ISO/IEC FCD 15444-1) is used for the compression encoding algorithm of still images. Further, Motion-JPEG 2000 (ISO/IEC FCD 1544-3) is used for the compression encoding algorithm of motion pictures. In Motion-JPEG 2000, each of continuous still images is handled as a frame, and each frame (still picture) is subjected to compression encoding in compliance to JPEG 2000. With regard to JPEG 2000, reference should be made to Noguchi, Y., "Next Generation Image Encoding Method JPEG 2000", Triceps, Tokyo, Feb. 13, 2001 (in Japanese).

Hereinafter, general summary of this technology will be provided.

Figure 11:
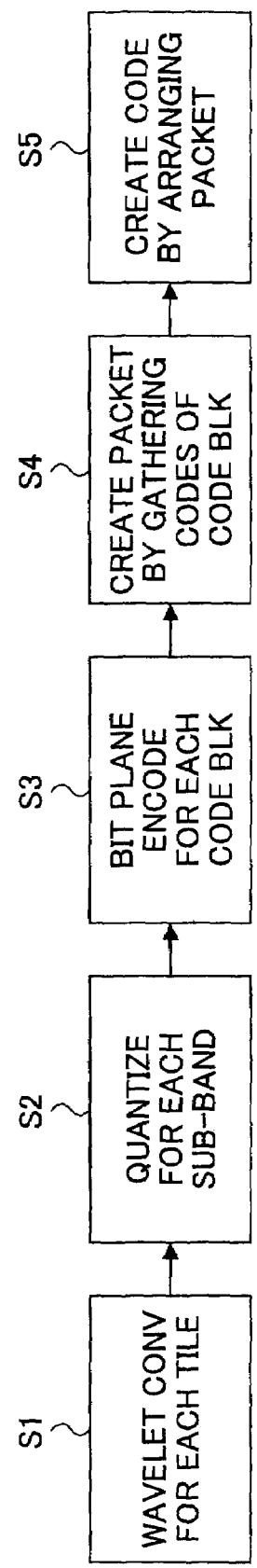
FIG. 11 is a block diagram illustrating a compression encoding algorithm according to JPEG 2000.

FIG. 11 shows a simplified block diagram for illustrating the algorithm of JPEG 2000.

In JPEG 2000, the image data subjected to compression encoding (image data of each frame in the case of handling a motion picture) is divided into rectangular non-overlapping regions called tiles for each component, and the image processing is conducted on such tiles. Further, it is possible that the tile may have the size of a full image. In this case, the division of the image into tiles is not performed.

Next, a two-dimensional wavelet conversion (discrete wavelet conversion DWT) is applied to each tile in each component (step S1).

FIG. 12 illustrates the wavelet conversion for the case the decomposition level number is 3.

Figure 12A:
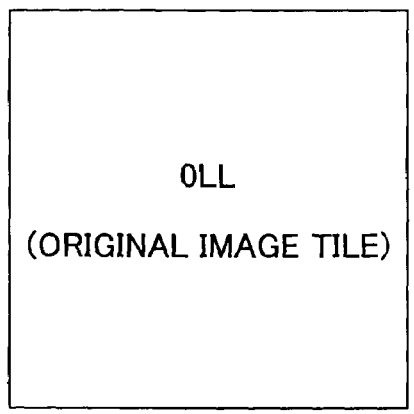
FIGS. 12A-12D are diagrams showing a two-dimensional wavelet conversion.
Figure 12B:
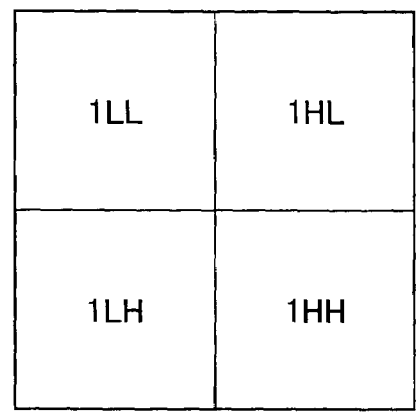

As a result of the two-dimensional wavelet conversion for the original image tile shown in FIG. 12A (decomposition level=0), the tile is divided into sub-bands 1LL, 1HL, 1LH and 1HH shown in FIG. 12B.

Figure 12C:
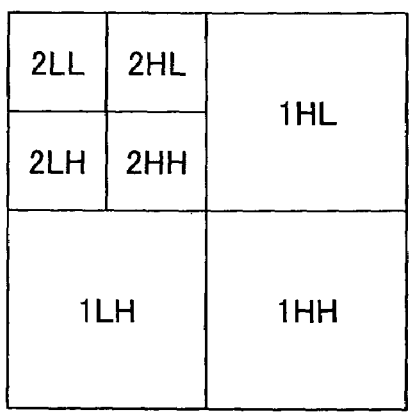
Figure 12D:
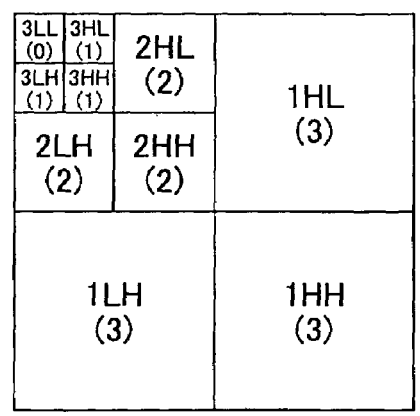

Further, by applying a two-dimensional wavelet conversion to the coefficients of the sub-band 1LL, the sub-band is divided into sub-bands 2LL, 2HL, 2LH and 2HH as represented in FIG. 12C. Further, by applying a two-dimensional wavelet conversion to the coefficients of the sub-band 2LL, the sub-band 2LL is divided into sub-bands 3LL, 3HL, 3LH and 3HH as represented in FIG. 12D. In FIG. 12D, the numeral in the bracket represents the resolution level.

The wavelet coefficients obtained by such a recursive divide (octave divide) of low-frequency components (LL sub-band coefficient) are then quantized for each sub-band (step 2). In JPEG 2000, both of reversible (loss-free) compression and irreversible (lossy) compression are possible. In the case of using reversible compression, the step width of quantization is 1, and no quantization is made in this stage.

After the quantization, each of the sub-band coefficients is subjected to an entropy encoding process (step S3). In this entropy encoding process, an encoding technique called EBCOT (embedded block coding with optimized truncation) is used, where the encoding process includes block dividing, coefficient modeling and binary arithmetic encoding. As a result of the entropy encoding, the bit plane of each sub-band coefficient is encoded from the upper plane to the lower plane for each block called code block.

The last two steps, S4 and S5, are the code formation process. First, packets are formed in the step S4 by gathering the codes of the code blocks formed in the step S3, and next, in the step S5, the packets formed in the step S4 are arranged in the progressive order and necessary tag information are added simultaneously, thereby, producing the encoded data of predetermined format.

FIG. 13 shows the format of the formed JPEG 2000 encoded data.

As can be seen in FIG. 13, the encoded data starts with a tag called SOC marker indicating the start of the encoded data, and a tag called Main Header is provided after the SOC marker, where the Main Header tag includes a description of encoding parameters, quantization parameters, and the like. Thereafter, the code data for the tiles are provided. In each tile, the code data is started with a tag called SOT marker, followed with a tag called Tile Header, a tag called SOD marker, and further with the data called Tile Data that contains the code sequence for that tile. At the end of each tile data, a tag called EOC marker is provided for indicating the end of the tile data.

JPEG 2000 having such a construction has an advantageous feature of a smaller degree of image deterioration at the time of data compression as compared with conventional JPEG, and this advantageous effect appears particularly conspicuous when the compression is made with high compression ratio. Further, JPEG 2000 can conduct both a reversible compression and an irreversible compression by using the same algorithm. Further, JPEG 2000 provides an advantageous feature of adjusting the compression ratio without conducting recompression as in the case of the conventional JPEG technology, by conducting a code sequence removal processing (post-quantization processing) to the encoded data.

Hereinafter, the imaging device and image processing method of one embodiment of the present invention will be described with reference to FIGS. 1-10.

FIG. 1 is a block diagram showing an example of the imaging device according to one embodiment of the present invention. It should be noted that the imaging device shown in FIG. 1 may be used for the electronic camera in digital still cameras or digital video cameras. However, the imaging device of FIG. 1 can also be used for other various imaging apparatuses including image scanners of stand-alone type or integrated type, in which the imaging device is integrated into a copying machine or a facsimile machine, as long as the imaging device is the type that has color-decomposing filters.

Referring to FIG. 1, the numeral 100 designates a general optical system for imaging and may include a lens system, an iris mechanism, a shutter mechanism, and the like. Further, the numeral 101 designates an imager that generates an image of an object with color decomposition and may include a CCD-type or MOS-type device that carries color filters for the color decomposition. Thus, the imager 101 decomposes the optical image focused on an imaging surface thereof by the optical system 100 into color component images and converts each color component image into electrical signals.

The color filter used for the imager 101 may have a color filter of Bayer array shown in FIG. 2A. Alternatively, the color filter may have the arrangement in which primary color filters are aligned obliquely as represented in FIG. 3A or the arrangement in which the primary color filters are aligned vertically. Further, it is possible to use complementary color filters of the Bayer array as shown in FIG. 5 or the vertical line array as shown in FIG. 6. In the drawings, it should be noted that R represents red, G (Gr, Gb) represents green, B represents blue, Y represents yellow, M represents magenta, and C represents cyan.

Referring to FIG. 1, the numeral 102 represents a CDS•A/D conversion part that converts the output signal of the imager 101 into a digital signal by conducting sampling and includes a correlated double sampling (CDS) circuit and an A/D conversion circuit. The output signal of this CDS•A/D conversion part 102 forms the raw image information or raw image data obtained by the imager. It should be noted that this raw image data is free from the influence of signal processing taking place inside the imaging device.

The numeral 103 represents an image processor, which may be realized by a high-speed digital signal processor controlled by a program (e.g., microcode). This image processor 103 conducts various functions such as a signal processing including gamma correction to the raw data, white-balance adjustment, edge enhancement, and the like. In addition, the image processor 103 performs functions such as the control of the imager 101, the control of CDS•A/D conversion part 102, the control of a display device, the automatic focusing control, automatic exposure control, detection of information for the white-balance adjustment, and the like. Further, the image processor 103 performs the function of dividing the raw data into plural color plane data each corresponding to a color. It should be noted that the display device 104 may be a liquid crystal display device and is used for representation of monitoring images (through images), recorded images and also various information to be displayed.

The reference numeral 108 is an encoder/decoder in compliance with JPEG 2000 and is used for compression of the pictured image data and decompression of the encoded image data.

The numeral 109 designates a medium recording unit used for writing and/or reading of information to and from a recording medium. Thus, the encoded image data is recorded, at the time of generating a still image of an object, into the recording medium as an image file of the JPEG 2000 file format. In the case of generating a moving image, the encoded data of the images are recorded as an image file of the Motion-JPEG file format. For the recording medium 110, various memory cards may be used.

Further, the numeral 111 designates an interface part. Thus, the imaging device of one embodiment of the present invention is capable of exchanging information with an external device such as a personal computer over a wired or wireless transmission path or network via this interface part 111.

The numeral 106 designates a system controller formed of a microcomputer, and the like. Thus, the system controller 107 responds to the instruction given by the user of the imaging device via an operational part 107 or to the information provided by the image processor 103 and carries out control operation such as the control of the shutter mechanism, iris mechanism, zooming mechanism, and the like of the optical system 100, or the control of the image processor 103, the encoder/decoder 108, the medium recording part 109, the interface part 111, and the like.

The numeral 105 is a memory and is used for the temporary storage area of the image data. Further, the memory 105 is used as the working memory area by the image processor 103, system controller 106, encoder/decoder 108 and the medium recording part 109. While not illustrated, the imaging device of FIG. 1 further includes mechanisms used commonly such as a strobe mechanism, an optical or electronic view finder, and the like.

It should be noted that the imaging device of FIG. 1 has two recording mode, the one is an ordinary recording mode and the other is a raw data recording mode. In the ordinary recording mode, the image data obtained by applying a synchronizing processing, gamma correction processing, white-balance adjustment, and all or a part of enhancement processing to the raw data, is recorded in the recording medium 110 after compression. In the raw data recording mode, such a signal processing is not conducted at all and the raw data is merely recorded into the recording medium 110 after compression. The user of the imaging device can select one of these two modes via the operation part 107.

In the description hereinafter, explanation of the ordinary recording mode will be omitted, as the operation of this ordinary recording mode is identical to those used conventionally.

Hereinafter, the operation in the raw recording mode will be described.

The raw recording mode actually includes four different modes A, B, C and D, and the user of the imaging device can choose one of these four mode via the operational part 107.

Mode A

Figure 7:
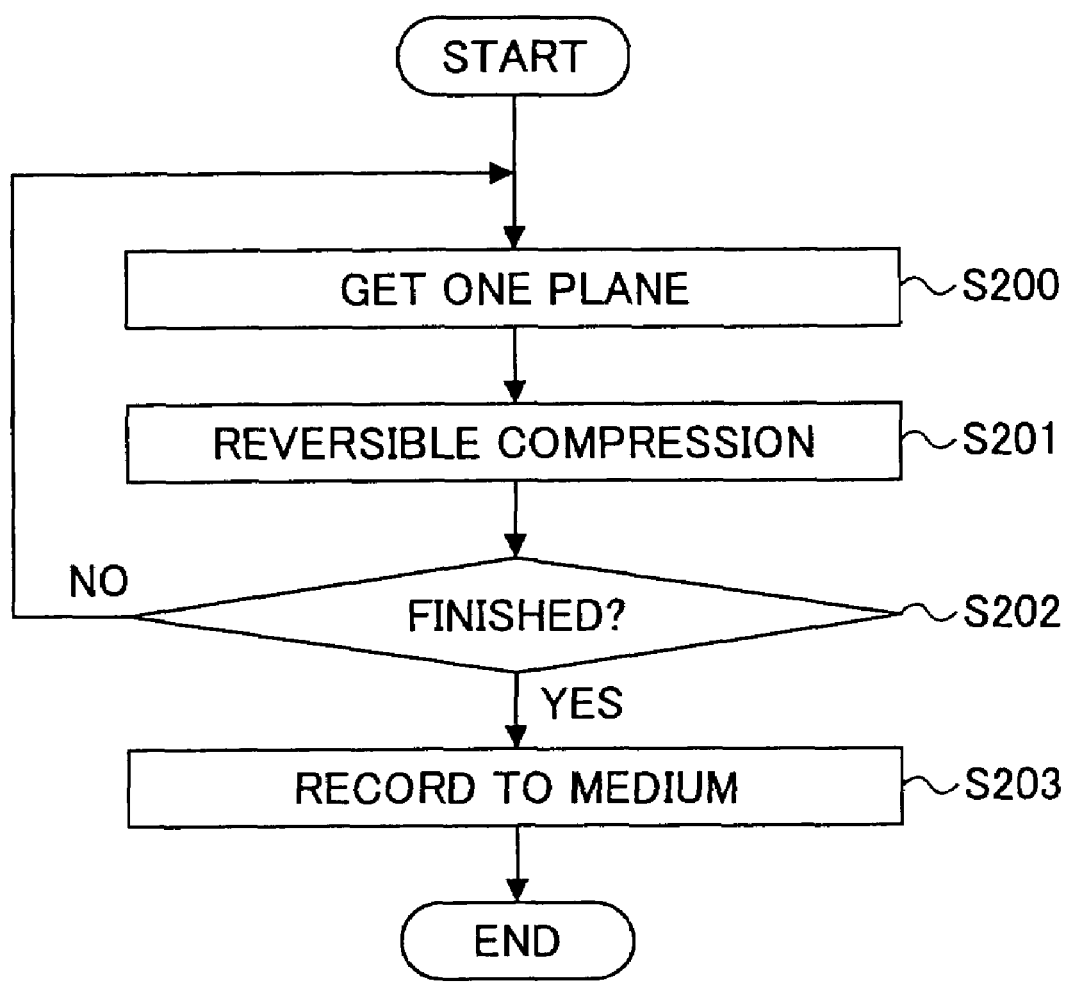
FIG. 7 is a flow diagram illustrating Mode A operation of the imaging device of FIG. 1.

FIG. 7 is a flowchart showing the operation in Mode A.

Referring to FIG. 7, a single color-plane data is acquired from the raw data of a single still image (the raw image data of a single frame in the case of generating a still picture or a motion picture) such that the data of the color-plane includes only the pixel information included in the raw image data and having the same color (step S200). The data of the color-plane thus acquired is then provided to the encoder/decoder 108 for reversible (loss-free) compression (step S201).

The process of dividing or decomposing the raw data into the color-plane of different colors is conducted by the image processor 103. In other words, the image processor 103 includes therein a module for decomposing the raw data into a plurality of color-planes of respective, different colors and creates the color-plane data for each of the colors from the raw data by collecting the pixel information according to the color.

The process of the steps S200 and S201 is repeatedly conducted under the control of the system controller 106 for all of the colors.

When the system controller 106 determines that the compression of the color-plane data is finally completed for the last color (YES in step S202), the encoder/decoder 108 produces encoded data as a series of the codes corresponding to the foregoing plural color-planes with the format as represented in FIG. 13. The encoded data thus obtained is then recorded into the recording medium 110 by the medium recording part 109 as the image file (step S203).

During the step S203, the system controller 106 further acquires various useful information for image processing such as format information of the raw image data (the number of bits, sequence order of the color-planes, color filter arrangement, and the like), imaging condition information (imaging sensitivity, shutter speed, ON/OFF state of strobe, and the like), imaging environment information (image including a partially bright area; image containing a skin-color part; a specific color being dominant in the image, and the like), where the system controller 106 provides this information to the medium recording part 109 for writing into the file header part of the image file. Thereby, it should be noted that the image processor 103 includes therein the means of evaluating the white balance for white-balance correction and is thus capable of acquiring information whether the pictured image contains skin color or not or what color component is predominant based on the evaluation value.

It should be noted that the color plane creation process can be conducted after the raw image data is once stored in the memory 105 or during the creation of data of the color plane, in other words, simultaneously to the reading of information from the imager 100. Embodiments of the present invention encompass both of these two cases.

In the case the color plane is already created and stored in the memory 105, the step S200 is conducted so as to read the data of single color-plane from the memory 105 and this data is simply provided to the encoder/decoder 108.

In the case the data of color plane does not exist yet, the step 200 is conducted so as to create the data of the color plane. As noted previously, embodiments of the present invention cover both of these cases.

In the flowchart of FIG. 7, it is represented that the step S200 and the step S201 are conducted consecutively for each color plane, while an embodiment of the present invention also includes the case in which the steps S200 and S201 are conducted simultaneously.

Further, by configuring the encoder/decoder 108 so as to conduct parallel processing of the foregoing two steps, it is possible to conduct the compression of plural color-plane data in parallel in the present invention. Further, it should be noted that the foregoing explanation applied also to the mode B, C and D to be described later.

Hereinafter, the data of the color planes will be described in relation to the color filter.

In the case where a Bayer array of primary color filters is used as represented in FIG. 2A, the information of the R pixels, the Gr pixels (G pixels aligned on the R line), the B pixels and the Gb pixels (G pixels aligned on the B pixel line) in the raw data are separated from each other as represented in FIG. 2B, and as a result, four color planes are created as represented in FIG. 2C by gathering the pixel information of the same color for each of the foregoing four colors.

In the raw image data, the pixels adjacent to each other correspond to different filter colors, and thus, the correlation between the adjacent pixel data is relatively weak as noted in FIG. 2A. Because of this reason, simple compression of raw image data cannot achieve large compression efficiency. On the other hand, the color-plane data have a strong correlation between adjacent pixels as noted in FIGS. 2B and 2C, and thus, the efficiency of compression is improved significantly when using such color-plane data. Here, it is particularly advantageous to divide the G color-plane data into the Gr color-plane data and Gb color plane data in view of the fact that the number of the pixels becomes nearly the same for all the color planes and the compression encoding processing is facilitated. Of course, it is possible to gather the data of Gr pixels and the Gb pixels to form a single green color plane.

In the case where an obliquely aligned array of primary color filters as represented in FIG. 3A is used, the information of the R pixels, G pixels and B pixels in the raw image data are separated from each other as represented in FIG. 3B, and as a result, three color planes are created as represented in FIG. 3C by gathering the pixel information of the same color for each of the foregoing four colors.

In the raw image data, the pixels adjacent to each other correspond to different filter colors, and thus, the correlation between the adjacent pixel data is relatively weak as noted in FIG. 3A. Because of this reason, simple compression of raw image data cannot achieve large compression efficiency. On the other hand, the color plane data have a strong correlation between adjacent pixels as noted in FIGS. 3B and 3C, and thus, the efficiency of compression is improved significantly when using such color-plane data.

Figures 4A, 4B, 4C:
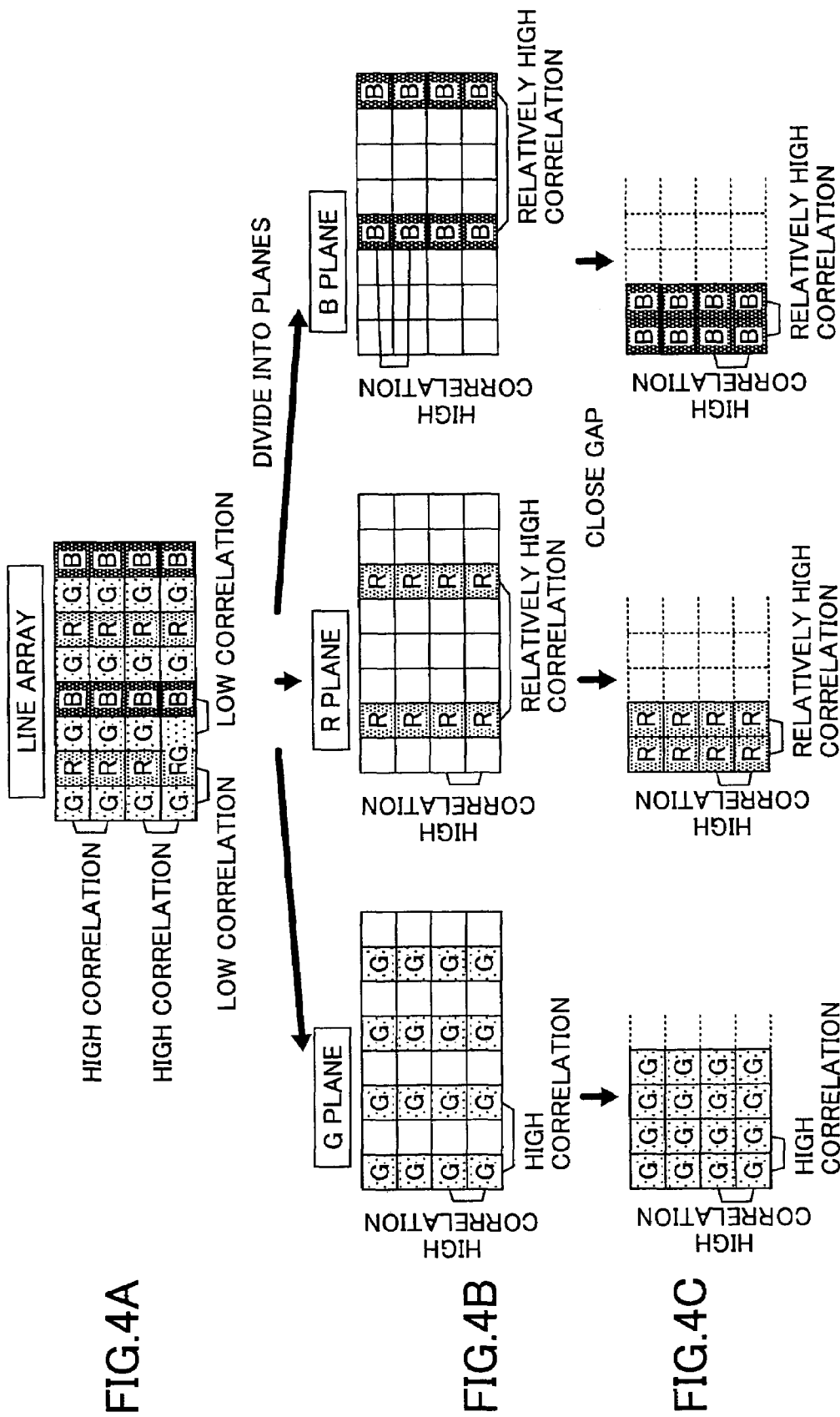
FIGS. 4A-4C are diagrams illustrating a line array of primary color filters and decomposition of raw image data into color planes.

In the case where a line array of primary color filters as represented in FIG. 4A is used, the information of the R pixels, the G pixels and the B pixels in the raw image data are separated from each other as represented in FIG. 4B, and as a result, three color planes are created as represented in FIG. 4C by gathering the pixel information of the same color for each of the foregoing four colors.

In the raw image data, the pixels adjacent to each other correspond to different filter colors, and thus, the correlation between the adjacent pixel data is relatively weak as noted in FIG. 4A. Because of this reason, simple compression of raw image data cannot achieve large compression efficiency. On the other hand, the color plane data have a strong correlation between adjacent pixels as noted in FIGS. 4B and 4C, and thus, the efficiency of compression is improved significantly when using such color-plane data.

In the case where a Bayer array of complementary color filters as represented in FIG. 5 is used, the information of the Y pixels, the M pixels, the C pixels and the G pixels in the raw image data are separated from each other, and as a result, four color planes are created by gathering the pixel information of the same color for each of the foregoing four colors.

In the raw image data, the pixels adjacent to each other correspond to different filter colors, and thus, the correlation between the adjacent pixel data is relatively weak. Because of this reason, simple compression of raw image data cannot achieve large compression efficiency. On the other hand, the color-plane data have a strong correlation between adjacent pixels, and thus, the efficiency of compression is improved significantly when using such color-plane data.

In the case where a line array of complementary color filters as represented in FIG. 6 is used, the information of the Y pixels, the M pixels, the C pixels and the G pixels in the raw image data are separated from each other, and as a result, four color planes are created by gathering the pixel information of the same color for each of the foregoing four colors.

In the raw image data, the pixels adjacent to each other correspond to different filter colors, and thus, the correlation between the adjacent pixel data is relatively weak. Because of this reason, simple compression of raw image data cannot achieve large compression efficiency. On the other hand, the color plane data have a strong correlation between adjacent pixels, and thus, the efficiency of compression is improved significantly when using such color plane data.

As mentioned above, embodiments of the present invention compress the raw image data with division into color planes, and because of this, it becomes possible to compress the raw data that is free from the influence of signal processing in the imaging device efficiently and record such compressed data on a recoding medium. Because the compression processing is reversible, the original raw data can be fully restored by decompressing the recorded encoded data by using the encoder/decoder 108 or any other external decoder.

With regard to the comparison with the case in which the R, G and B color planes are reversibly compressed by conducting a color interpolating processing by acquiring the RGB information for each pixel of the imager, the amount of the data before the compression increases by three times the amount of the raw data as a result of the interpolating processing, and thus, the image file size is increased naturally by about three times in this case as compared with the mode A of the present invention.

Mode B

Figure 8:
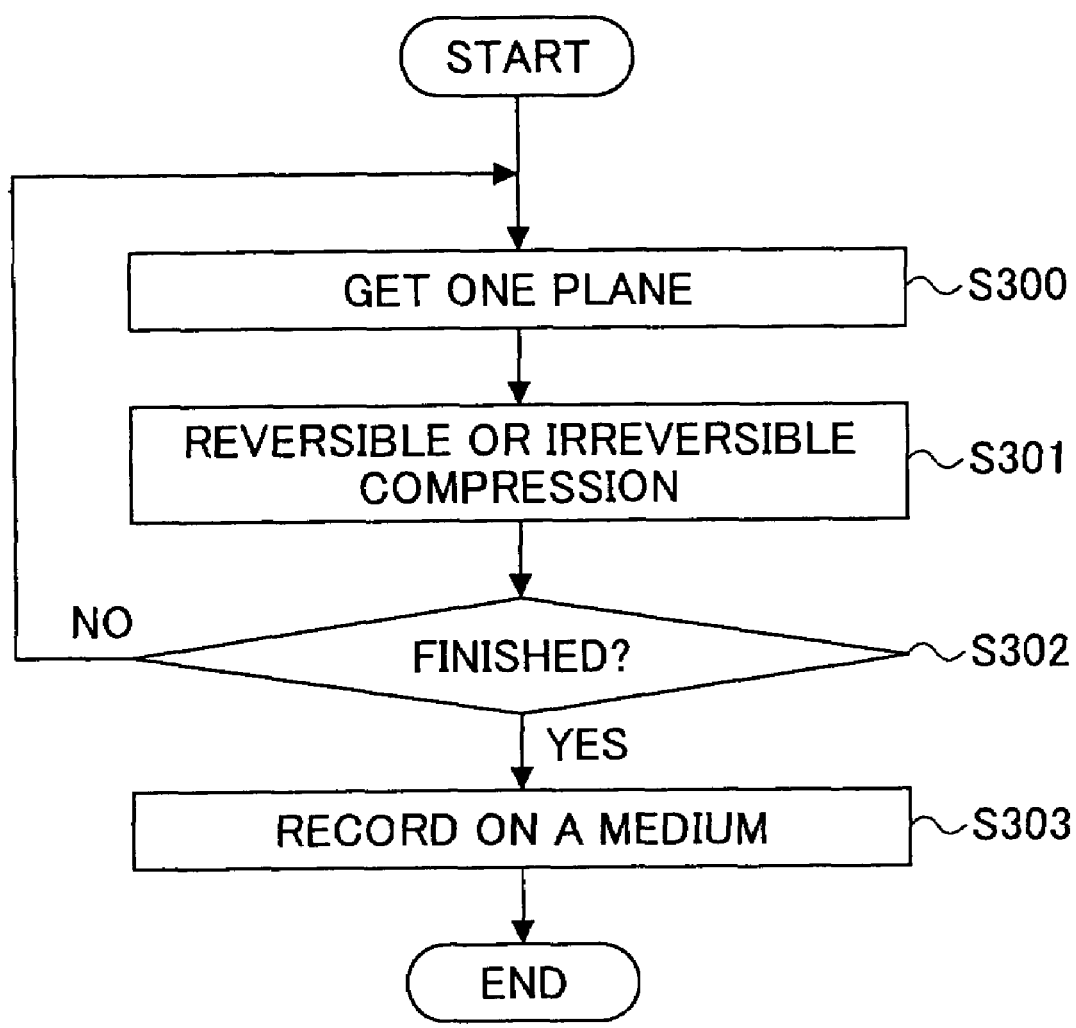
FIG. 8 is a flow diagram illustrating Mode B operation of the imaging device of FIG. 1.

FIG. 8 is a flowchart showing the operation in Mode B.

Referring to FIG. 8, the step S300 is the process step identical to the step S200 of Mode A.

In one embodiment, a reversible compression algorithm is used selectively to the color plane that provides profound effect on the resolution of the reproduced image. For the color planes of other colors, on the other hand, in one embodiment an irreversible compression algorithm is used. Thereby, the compression algorithm thus chosen is executed in the encoder/decoder 108 (step S301).

In the case primary color filters as shown in any of FIG. 2A, FIG. 3A or FIG. 4A is to be used for the color decomposition, for example, a reversible compression algorithm is used for the data of the G (Gr, Gb) color plane and an irreversible compression algorithm is used for the data of R and B color planes. By doing so, there occurs no compression loss for the G pixel information and high resolution is maintained. On the other hand, the data of the R and B color planes are subjected to irreversible compression, and compression loss may be caused for the R and B pixel information. However, because of the loss-free compression for the G color plane, the degradation of resolution is held low even when such a compression loss is caused for the R and B pixel information, and excellent resolution is maintained for the reproduced images. On the other hand, there may be some degradation in the color reproducibility in the reproduced images as a result of the loss caused in the R and B pixel information.

Under control of the system controller 106, a similar processing is repeated for each of the colors. Thus, when the system controller 106 determines that the processing for the last color is finally completed (YES in step S302), the obtained encoded data of the raw image data is recorded on the recording medium 110 by the medium recording part 109 as an image file (step S303). Further, information similar to the case of Mode A is attached to the file header of the image file thus recorded.

In this mode, too, the raw data is divided into color planes characterized by high correlation between adjacent pixels at the time of compression. Because some color planes undergo irreversible compression in one embodiment, it is possible to reduce the size of the image data as compared with the case of Mode A.

Because some color planes undergo irreversible compression in the present Mode B, it is not possible to restore the image data to be identical with the raw image data with the decompression of the encoded data. Nevertheless, the present mode can reproduce the image data that is free from the effect of signal processing inside the imaging device.

Because embodiments of the present invention use a compression encoding algorithm in compliance with JPEG 2000, it is also possible to conduct a reversible compression for the color plane that provides less effect on the resolution. In this case, the compression ratio can be adjusted during the final code formation process by conducting a post quantization process. Thereby, it becomes possible to control the size of the image file to a predetermined constant size or target size. Further, it should be noted that the degradation of image quality caused by the irreversible compression is generally suppressed as compared with the case of using JPEG.

Mode C

Figure 9:
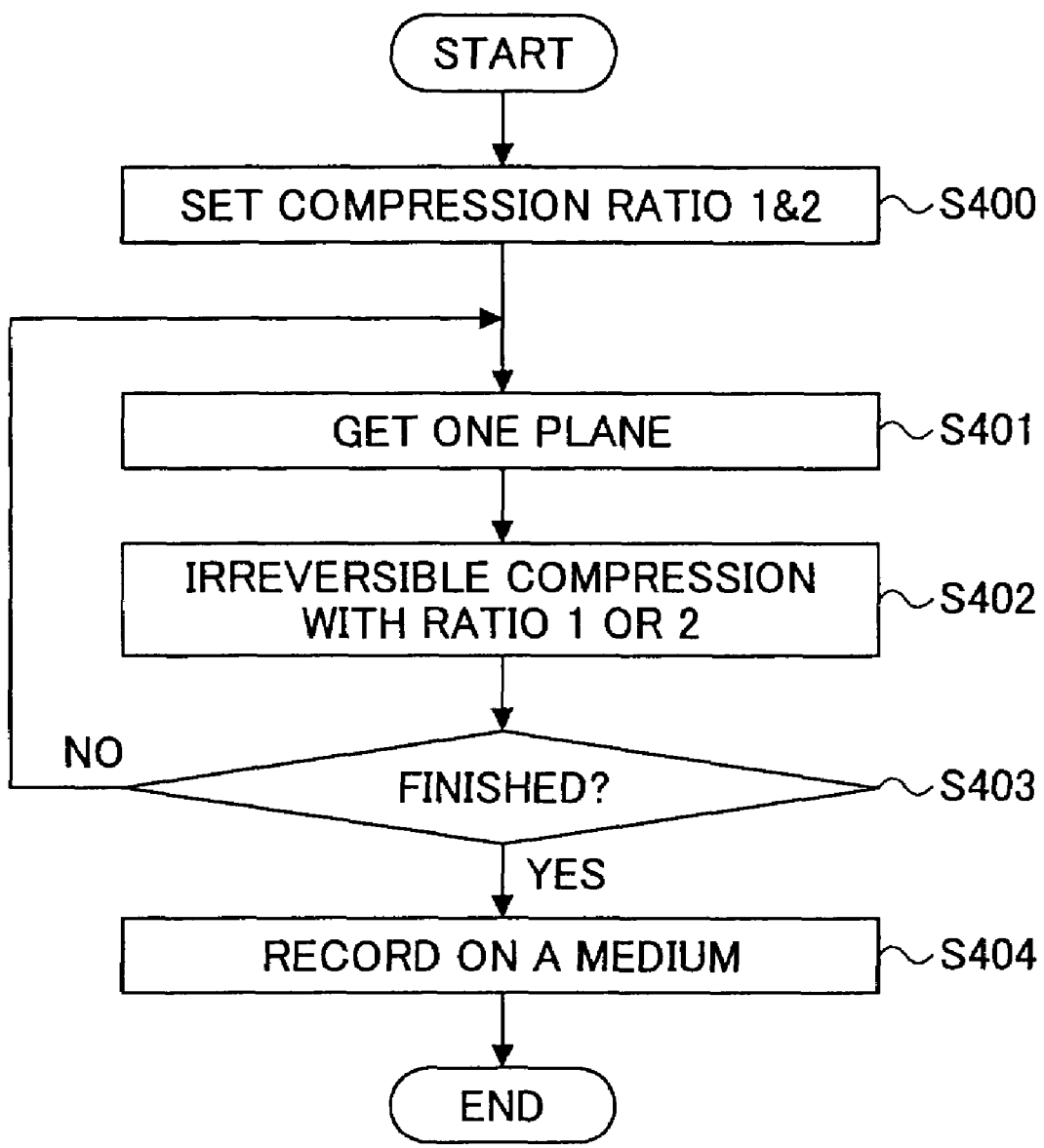
FIG. 9 is a flow diagram illustrating Mode C operation of the imaging device of FIG. 1.

FIG. 9 is a flowchart showing the operation in Mode C.

In Mode C, the user of the imaging device can select the operational mode from a "standard mode", a "resolution preference mode" and a "color reproducibility preference mode". Depending on the selection of the user, the system controller 106 sets the compression ratio to a compression ratio 1 or compression ratio 2 (step S400).

The step S401 is identical to the step S200 of Mode A.

Further, the system controller 106 causes the encoder/decoder 108 to execute a reversible compression for the data of the color planes with the compression ratio determined for each of the color planes (step S402). In the case where the primary color filters such as the one shown in FIG. 2A, FIG. 3A or FIG. 4A are used for the color decomposition, for example, a reversible compression with the compression ratio 1 is applied to the color plane G (Gr, Gb) and a reversible compression with the compression ratio 2 is applied to the color planes R and B.

Under the control of the system controller 106, a similar processing is repeated for each of the colors. When the system controller 106 determines that the processing of the last color plane is finally completed (YES in step S403), the encoded data thus obtained from the raw image data is recorded on the recording medium 110 by the medium recording part 109 as an image file (step S404). Further, information similar to the case of Mode A is attached to the file header part of the image file.

The compression ratio 1 and the compression ratio 2 are determined for the foregoing "standard mode", "resolution preference mode" and "color-reproducibility preference mode" as follows. For the sake of convenience of explanation, it is assumed that the color decomposing filters comprise the primary color filters.

In the case the "standard mode" is selected, the compression ratio for the G plane and the compression ratio for the R and B planes are set to respective standard compression ratios.

In the case the user has selected the "resolution preference mode," on the other hand, the compression ratio 1 applied to the G color plane, which provides a profound effect of the resolution, is set to be smaller than the standard compression ratio for the G color plane so as to reduce, and potentially minimize, the loss of pixel information, while the compression ratio 2 applied to the R and B planes is set to be higher than the standard value used for the R and B color planes.

Further, in the case the "color-reproducibility preference mode" is selected by the user, the compression ratio 2 applied to the R and B color planes is set to be smaller than the standard compression ratio for the R and B color planes so as to reduce, and potentially minimize, the loss of the R and B pixel information and to enhance the color reproducibility.

By controlling the compression ratios 1 and 2 as noted above, it becomes possible to record encoded data for improved resolution, encoded data for improved color reproducibility or encoded data of intermediate nature on the recording medium according to the wish of the user of the imaging device, while avoiding the variation of the file size.

In this mode, too, high compression efficiency is achieved as a result of the recording scheme in which the raw data is divided into color planes in which a strong correlation exists between adjacent pixels, similarly to the case of Mode A. As the present embodiment uses irreversible compression algorithm, it is not possible to reproduce the image data exactly identical with the original image data by decompressing the encoded data recorded on the medium. Nevertheless, the present embodiment is capable of reproducing image data free from the effect of signal processing conducted inside the imaging device. Further, the present embodiment can provide a smaller file size as compared with the case of Mode A.

Similarly to Mode A, one embodiment of the present Mode C uses a compression algorithm in compliance with JPEG 2000, and because of this, it is possible to adjust the compression ration easily to the preset compression ratio without recompression, by merely conducting a post quantization process.

Mode D

Figure 10:
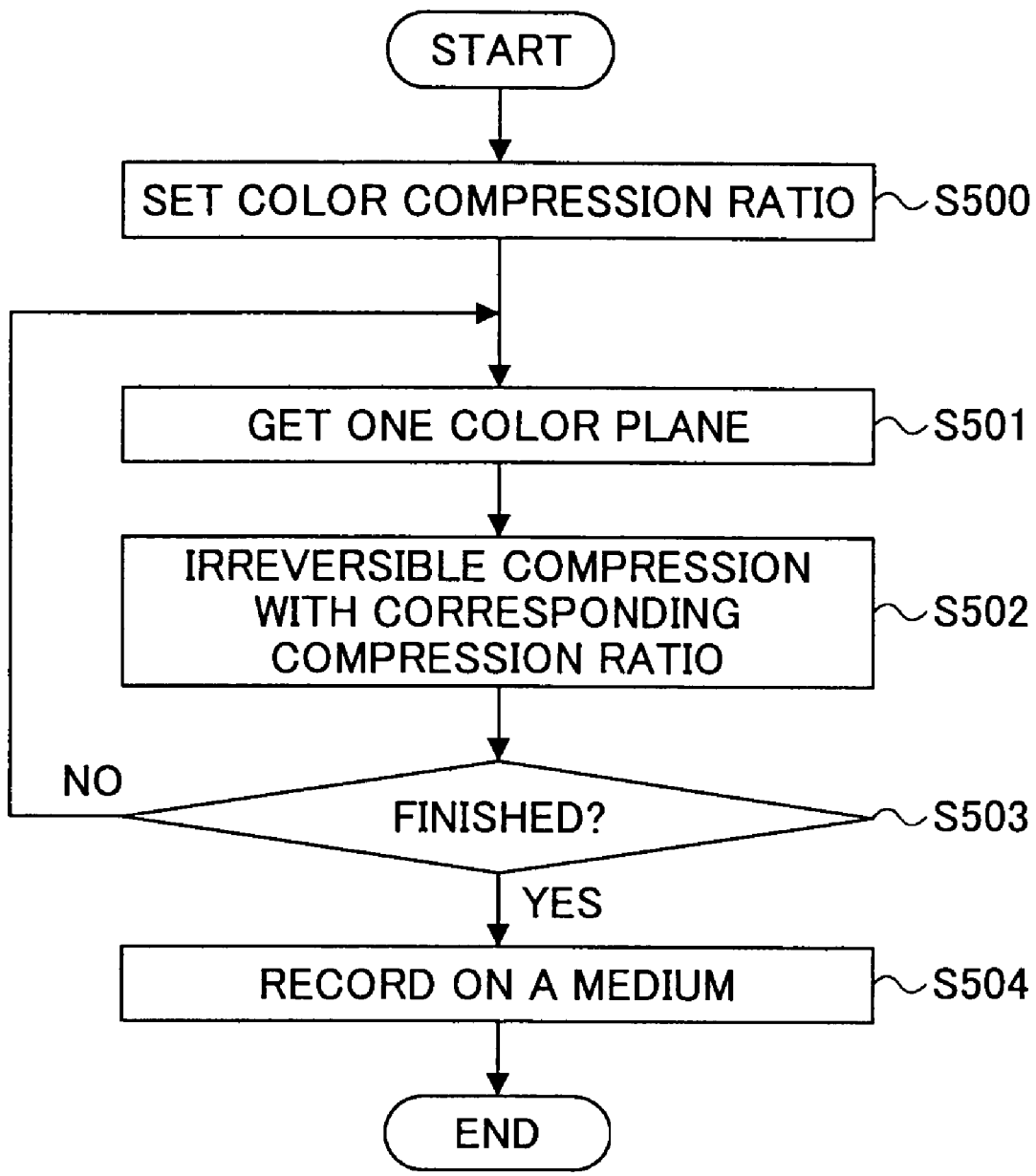
FIG. 10 is a flow diagram illustrating Mode D operation of the imaging device of FIG. 1.

FIG. 10 is a flowchart explaining the operation in Mode D of the present invention.

Referring to FIG. 10, the system controller 106 sets the compression ratio applied to each of the color planes (step S500).

Next, a step S501 is conducted where the step S501 is the process step identical to the step S200 of Mode A.

Next, the system controller causes the encoder/decoder 108 to execute the irreversible compression for a given color plane with the compression ratio determined in the step S500 for this color plane (step S502). Further, a similar processing is repeated for all of the color planes under the control of the system controller 106.

When it is determined that the processing of the last color plane is finished (YES in step S503), the encoded data of the raw image data is recorded on a recording medium 110 by the medium recording part 109 (step S504). Thereby, information similar to the one used in Mode A is attached to the file header of the image file.

Next, description will be made on step S500. In the description hereinafter, it is assumed that primary color filters are used for the color filter for color decomposition.

In one mode, the image processor 103 is used to detect high-frequency components in the raw image data for the R, G and B information at the central part of the image and the system controller 106 sets the compression ratios applied to the R, G and B color planes according to the more or less of the detected high-frequency component thus detected. In more detail, the system controller 106 sets the compression ratio of the color plane in which the amount of the high-frequency component is small to be higher than a standard compression ratio.

In another mode, the system controller 106 uses the evaluation information on white balance, which is provided by a white-balance evaluation unit integrated into the image processor 103, for determining what color component is plentiful and what color component is scarce, and sets the compression ratio of the color component determined scarce to be higher than a standard compression ratio.

As a result of such adjustment of the compression ratios for different color planes, it becomes possible to reduce the image file size.

In this mode, too, high compression efficiency is achieved as a result of the recording scheme in which the raw data is divided into color planes in which a strong correlation exists between adjacent pixels, similarly to the case of Mode A. As one embodiment uses irreversible compression algorithm, it is not possible to reproduce the image data exactly identical with the original image data by decompressing the encoded data recorded on the medium. Nevertheless, the present embodiment is capable of reproducing image data free from the effect of signal processing conducted inside the imaging device. Further, the present embodiment can provide a smaller file size as compared with the case of Mode A.

Further, it is possible in Mode D to construct the imaging device of one embodiment of the present invention such that the user of the imaging device can directly control the setting of the compression ratios.

For example, the image processor 103 may provide the color histogram of the raw image data to the display 104 in the step S500 and the user may determine the compression ratios of the color planes based on the histogram thus represented on the display 104. Thereby the user may control the system controller 106 by way of operating the operating device 107. By doing so, it becomes possible for the user to control the picture quality of the recorded image according to the purpose of the generating the image.

It should be noted that JPEG 2000 could conduct reversible compression and irreversible compression by using the same algorithm. In view of the fact that JPEG 2000 further has the feature of superior image quality and compression efficiency to conventional JPEG, it is preferable to use JPEG 2000 for the encoder/decoder 108.

On the other hand, in the case only irreversible compression is used as in the case of Mode C or Mode D, it is possible to use conventional JPEG for the encoder/decoder 108.

While the present invention has been explained for the imager having color filters for color decomposition on the imaging surface, the present invention is applicable also to any other imagers as long as similar color decomposition is conducted by other means.

It should be noted that the image processing explained heretofore with reference to the flowcharts of FIGS. 7-10 could be conducted also by a computer such as a personal computer or a microcomputer by executing a program code recorded on a processor-readable medium.

Figure 14:
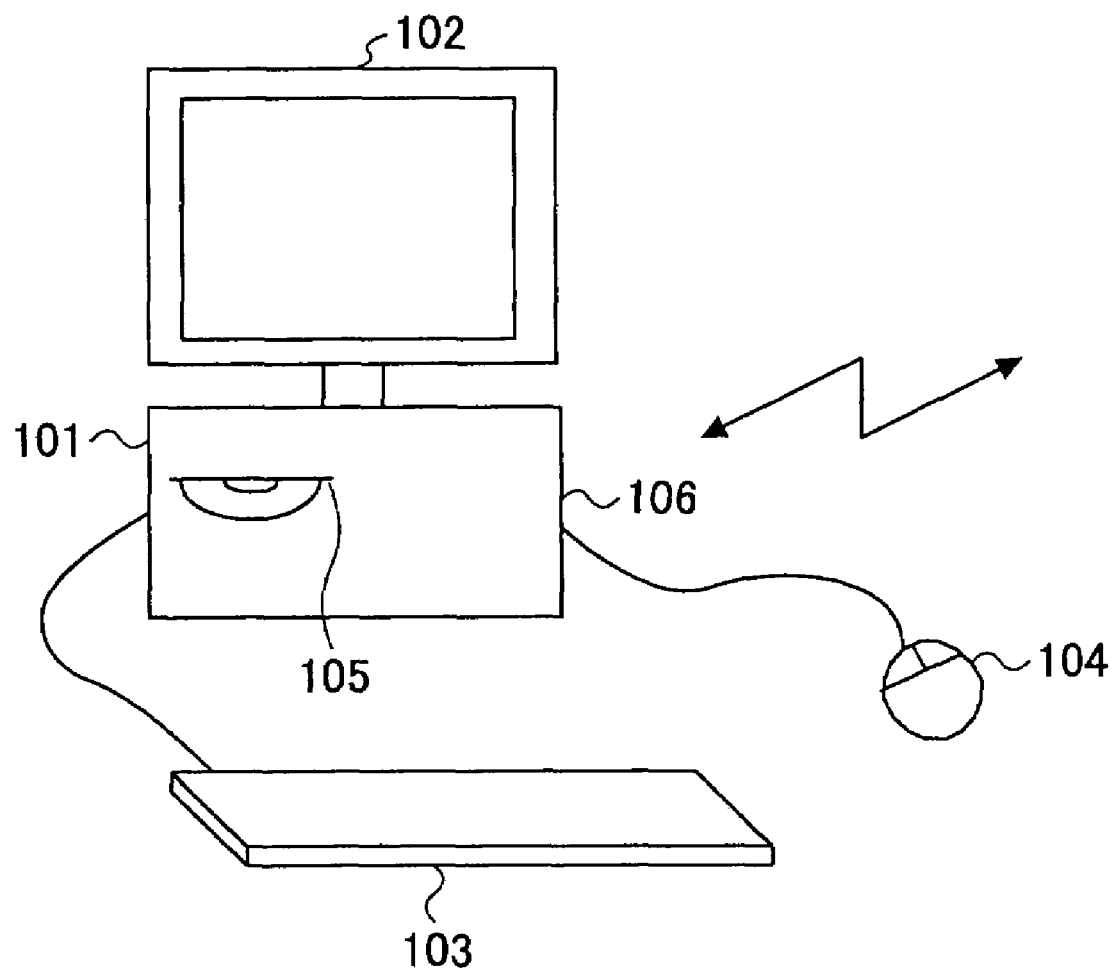
FIG. 14 is a diagram showing a computer that can conduct the image processing of one embodiment of the present invention.

FIG. 14 shows an example of such a computer usable for the foregoing image processing.

Referring to FIG. 14, the computer includes main body 101 including therein a processor and a memory, a display unit 102, a manual input device such as a keyboard 103, a pointing device 104 such as a mouse, a storage device 105 such as a disk drive and an interface 106 connected to a network.

Further, the present invention is by no means limited to the embodiments described heretofore, but various variations and modifications may be made without departing from the scope of the invention.

What is claimed is:

1. A color imaging device comprising:
   an imager to generate an image with color decomposition, the imager producing raw image data as a result of generating the image;
   a decomposing unit to decompose the raw image data into a plurality of plane data such that each plane data includes pixel information of the same color;
   a compression and encoding unit to compress the plane data of each color divided by the decomposing unit with an irreversible compression process;
   a controller to control a compression ratio of the irreversible compression process conducted by the compression and encoding unit for the plane data of each color independently with each other; and
   an information acquisition unit to acquire an evaluation value of white-balance from the raw data,
   wherein the controller determines whether a proportion of a color component is large or small based on the evaluation value of white-balance acquired by the information acquisition unit, the controller further setting the compression ratio of the color plane to be higher than a standard compression ratio for the color component of which proportion has been determined to be small.

2. A color imaging process comprising:
   generating an image with color decomposition, including producing raw image data as a result of generating the image;
   a decomposing the raw image data into a plurality of plane data such that each plane data includes pixel information of the same color;
   a compressing the plane data of each color with an irreversible compression process;
   controlling a compression ratio of the irreversible compression process for the plane data of each color independently with each other; and
   acquiring an evaluation value of white-balance from the raw data,
   wherein controlling the compression ratio of the irreversible compression process comprises:
   determining whether a proportion of a color component is large or small based on the evaluation value of white-balance, and
   setting the compression ratio of the color plane to be higher than a standard compression ratio for the color component of which proportion has been determined to be small.

* * * * *